US006724774B1

United States Patent
Sashide (10) Patent No.: US 6,724,774 B1
(45) Date of Patent: Apr. 20, 2004

(54) SUBSCRIBER ACCESS APPARATUS CAPABLE OF ADAPTING ALL OF ANALOG COMMUNICATION ACCESS NETWORK, ISDN ACCESS NETWORK AND XDSL ACCESS NETWORK TO ATM CORE NETWORK

(75) Inventor: Naoya Sashide, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/313,287

(22) Filed: May 18, 1999

(30) Foreign Application Priority Data

May 18, 1998 (JP) ............................................ 10-135336

(51) Int. Cl.[7] ................................................ H04J 3/22
(52) U.S. Cl. ................... 370/466; 370/400; 370/395.51
(58) Field of Search ............................. 370/230, 254, 370/328, 401, 409, 395.1, 396, 397, 398, 395.3, 395.32, 395.51, 395.6, 395.61, 465, 466, 386, 351–357, 469, 467, 400

(56) References Cited

U.S. PATENT DOCUMENTS

| 5,305,312 A | * | 4/1994 | Fornek et al. ............... 370/264 |
| 5,784,371 A | * | 7/1998 | Iwai ........................... 370/397 |
| 5,784,376 A | | 7/1998 | Le Gall |
| 5,822,523 A | | 10/1998 | Rothschild et al. |
| 6,023,465 A | * | 2/2000 | Brueckheimer et al. .... 370/386 |
| 6,084,881 A | * | 7/2000 | Fosmark et al. ............. 370/397 |
| 6,130,879 A | * | 10/2000 | Liu ............................. 370/230 |
| 6,157,614 A | * | 12/2000 | Pasternak et al. ........... 370/236 |
| 6,363,079 B1 | * | 3/2002 | Barzegar et al. ............ 370/465 |
| 6,477,595 B1 | * | 11/2002 | Cohen et al. ................ 710/105 |

FOREIGN PATENT DOCUMENTS

| EP | 0 828 363 | 3/1998 |
| EP | 0 835 015 | 4/1998 |
| JP | 6-197118 | 7/1994 |
| JP | 6-197119 | 7/1994 |
| JP | 6-276219 | 9/1994 |
| JP | 7-264196 | 10/1995 |
| JP | 8-195746 | 7/1996 |
| JP | 8-331130 | 12/1996 |
| JP | 8-331616 | 12/1996 |
| JP | 9-162888 | 6/1997 |

* cited by examiner

Primary Examiner—Dang Ton
Assistant Examiner—Phuc Tran
(74) Attorney, Agent, or Firm—Foley & Lardner (57) ABSTRACT

The controller 500 monitors the analog-SLIC 100, the ISDN-SLIC 200, the xDSL-SLIC 300 and the signal processor 400 and selectively produces first and second control signals, wherein the first control signal responds to at least one of the analog signals, the ISDN data signals and the xDSL signals, each of which is received by the responding SLIC, while the second control signal responds to the ATM cells received by the signal processor 400 from the ATM Core Network. Selective one of the first and second control signals is input to the signal processor 400 so that the received signals are subjected to a suitable signal process in correspondence with a content of the received signals.

29 Claims, 9 Drawing Sheets

SUBSCRIBER ACCESS APPARATUS

SUBSCRIBER ACCESS APPARATUS CAPABLE OF ADAPTING ALL OF ANALOG COMMUNICATION ACCESS NETWORK, ISDN ACCESS NETWORK AND XDSL ACCESS NETWORK TO ATM CORE NETWORK

BACKGROUND OF THE INVENTION

This invention relates to a subscriber access apparatus adapting local access networks in which subscribers directly participates, to public network, such as ATM Core Network. Such apparatus is also called a subscriber access node. In particular, this invention relates to a novel subscriber access apparatus or node.

A recent trend has been directed to technologies which delivers high bandwidth data signals over existing copper wiring provided by the telephone companies, and such technologies are referred to as digital subscriber line (DSL) technologies.

DSL technologies are generally categorized into four types of Asymmetric DSL (ADSL), High-data-rate DSL (HDSL), Single-line DSL (SDSL) and Very-high-data-rate DSL (VDSL). On the other hand, xDSL is used as a group term referring to ADSL, HDSL, SDSL and VDSL.

Specifically, ADSL technology uses ADSL modem in compliance with ANSI T1.413 and is designed so that a wide bandwidth is assigned to a downstream direction (from the central office to the customer site) in comparison with an upstream direction. For example, downstream bandwidth ranges from 1.5 to 9 Mbps, while upstream bandwidth ranges from 16 to 640 kbps.

Over access networks based on such xDSL technologies, ATM cells can be directly transported. Herein, access networks based on xDSL technologies are also called xDSL access networks. For the purpose of such transporting, various proposals have been made about transport configurations, architectures and interfaces for ATM. For example, ADSL Forum provides technical reports about the above proposals on their web site.

On the contrary to such xDSL technologies, over other access networks based on general analog communication and Narrow-band ISDN (N-ISDN), ATM cells could not directly be transported. Herein, access networks of general analog communication and ISDN are called analog communication access networks and ISDN access networks, respectively. For analog communication or ISDN, subscriber access apparatuses for STM, STM exchanges and STM-ATM mutual converters are, therefore, required to adapt between ATM Core Network and these access networks of analog communication or N-ISDN, As a result, subscriber access apparatuses of types different from each other should be located in local access networks That is, STM subscriber access apparatuses are connected to analog commutation access networks or ISDN access networks, while ATM subscriber access apparatuses are connected to xDSL access networks.

As other techniques relating to the above topics, JP-A Nos. 6-197118 and 6-197119 disclose subscriber access apparatuses which can adapt ATM Core Network directly over the analog communication access network, such as a telephone commutation access network. In addition, JP-A No. 6-276219 also discloses a subscriber access apparatus which can adapt ATM Core Network directly over the ISDN access network.

However, JP-A Nos. 6-197118, 6-197119 and 6-276219 do not take xDSL technologies into consideration and these apparatuses can not handle xDSL signal, accordingly. Therefore, subscriber access apparatuses which are different in structure from each other should be prepared each of xDSL access networks and the others, even though these techniques are proposed.

SUMMARY OF THE INVENTION

This invention, therefore, provides a subscriber access apparatus for use in common to all of analog communication access networks, ISDN access networks and xDSL access networks. Such apparatus is connected, on a downstream side, to these access networks and is connected, on a upstream side, to the ATM Core Network.

According to one aspect of this invention, the subscriber access apparatus comprises an analog-SLIC, an ISDN-SLIC, an xDSL-SLIC, a signal processor and a controller. Herein, SLIC stands for subscriber line interface circuit.

The analog-SLIC is connected, on the downstream side, to an analog communication line which is for analog signals and which is included in the analog communication access network. Such analog-SLIC carries out mutual conversion between the analog signals and pulse code modulation (PCM) signals.

The ISDN-SLIC is connected, on the downstream side, to an ISDN line which is for ISDN data signals including B-channel data signals and which is included in the ISDN access network. Such ISDN-SLIC extracts, on the downstream side, the B-channel data signals from the ISDN data signals to produce the B-channel data signals as digital data signals. On the other hand, the ISDN-SLIC produces the ISDN data signals having the B-channel data signals corresponding to the digital data signals on the upstream side.

The xDSL-SLIC is connected, on the downstream side, to an xDSL line which is for xDSL signals and which is included in the xDSL access network. Such xDSL-SLIC splits, on the downstream side, the xDSL signals into high and low frequency data signals. On the other hand, the xDSL-SLIC produces the xDSL signals from the high and low frequency data signals on the upstream side.

The signal processor is connected, on the upstream side, to the ATM Core Network which includes ATM exchange, and so on, and which transfers ATM cells each having a header and a payload on the ATM Core Network. Such signal processor processes, on the downstream side, the PCM signals, digital data signals and high and low frequency data signals in response to a first control signal to produce the ATM cells obtained by mapping the PCM signals, the digital data signals and the high and low frequency data signals into payloads of the ATM cells. On the other hand, the signal processor processes, on the upstream side, the ATM cells in response to a second control signal to divide the ATM cells into the PCM signals, the digital data signals, the high and low frequency data signals.

The controller monitors the analog-SLIC, the ISDN-SLIC, the xDSL-SLIC and the signal processor. Besides that, the controller produces the first control signal in response to at least one of the analog signals, the ISDN data signals and the xDSL signals. That is, when the analog-SLIC receives the analog signal, the controller detects it and produces the first control signal. And also, when the ISDN-SLIC or the xDSL-SLIC receive the ISDN data signals or the xDSL signals, respectively, the controller detects it and produces the first control signal. On the other hand, the controller produces the second control signal when the signal processor receives the ATM cells from the ATM Core Network.

Specifically, in such apparatus, the xDSL-SLIC may be an ADSL-SLIC to be connected, through an ADSL line as the xDSL line, to an ADSL modem in compliance with ANSI T1.413 standard. Herein, the ADSL line is used for an ADSL signals as the xDSL signals.

Furthermore, in such apparatus, the signal processor may comprise a time switch, a CLAD device and an ATM network interface circuit, as the followings.

The time switch receives, on the downstream side, the PCM signals, the digital data signals and the low frequency data signals and then makes upward switch-paths to produce intermediate data signals, in response to the first control signal. On the other hand, the time switch receives, on the upstream side, the intermediate data signals and then makes downward switch-paths to produce the PCM signals, the digital data signals and the low frequency data signals, in response to the second control signal.

The CLAD device receives, on the downstream side, the intermediate data signals and the high frequency data signals and then assembles the ATM cells, in response to the first control signal. On the other hand, the CLAD device receives, on the upstream side, the ATM cells and then disassembles the ATM cells to produce the high frequency data signals and the intermediate data signals, in response to the second control signal.

The ATM network interface circuit is used in case where the ATM Core network has an interface to be connected to a synchronous optical network (SONET), and receives the ATM cells and maps the ATM cells to the interface of the SONET.

DESCRIPTION OF THE PREFERRED EMBODIMENTS

Prior to detail description of embodiments of this invention, brief description will at first made about an existing network environment and an overview of the embodiments of this invention.

Figure 1:
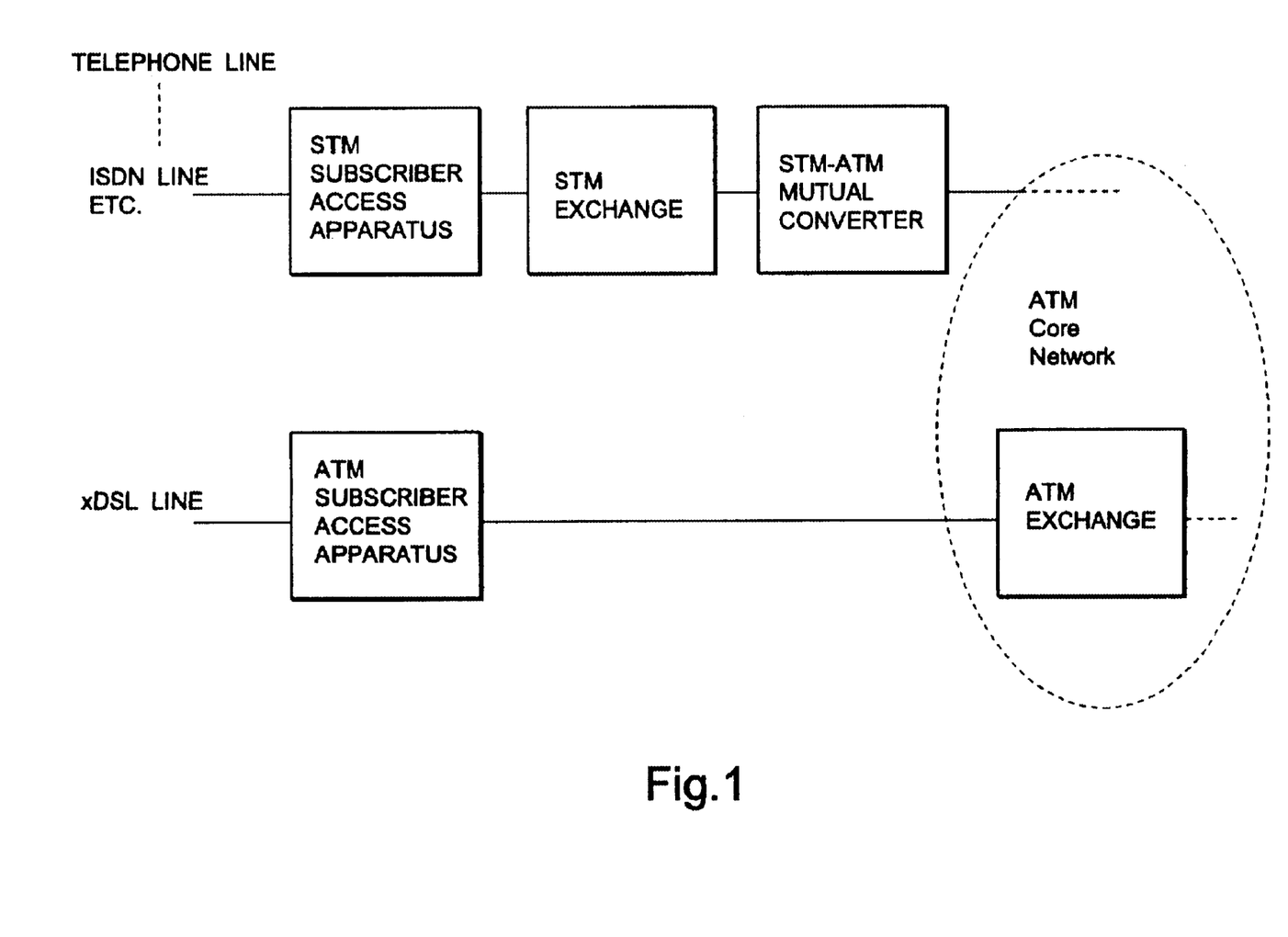
FIG. 1 shows an existing network environment including STM and ATM subscriber access apparatuses.

Referring to FIG. 1, in an existing network environment, an ATM subscriber access apparatus is connected to an xDSL line which is included in an xDSL access network. On the other hand, an STM subscriber access apparatus is connected to an analog communication line of a telephone line, an ISDN line, or the like. That is, subscriber access apparatuses which are different in structure from each other should be prepared each of the xDSL access networks and the others. Besides, since the STM subscriber access apparatus cannot be directly connected to ATM Core Network, an STM exchange and an STM-ATM mutual converter are required to connect the STM subscriber access apparatus to the ATM Core Network.

Figure 2:
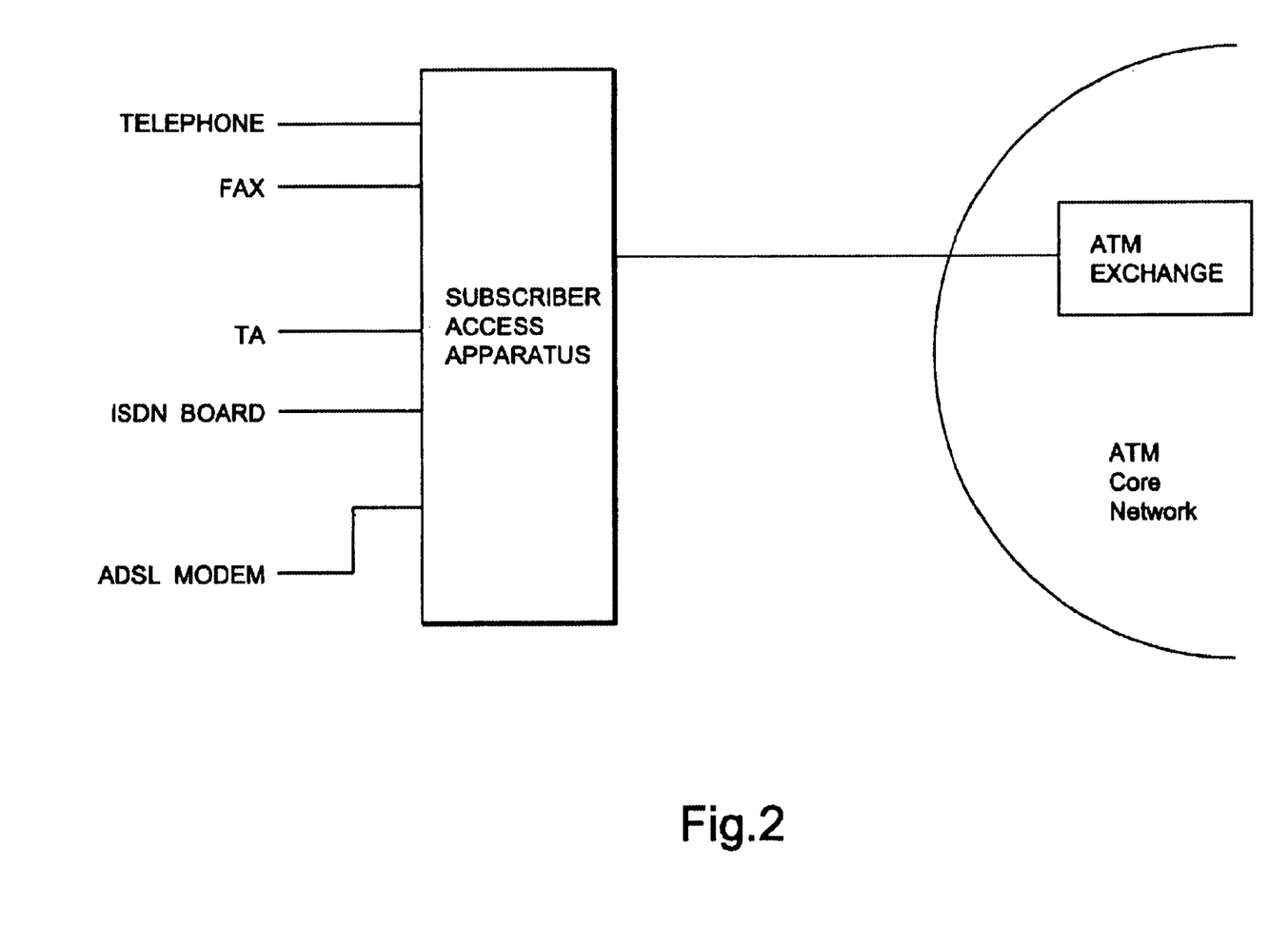
FIG. 2 shows a relationship between ATM Core Network and a subscriber access apparatus according to one aspect of the present invention.

On the other hand, a subscriber access apparatus according to one aspect of the present invention accommodates various lines each of which is connected to a telephone, a facsimile, a terminal adapter (TA), an ISDN board installed in a personal computer, an xDSL modem, such as an ADSL modem, and so on. That is, the illustrated apparatus can handle analog signals, ISDN data signals and xDSL signals, such as ADSL signals.

Furthermore, the illustrated apparatus can be directly connected to the ATM Core Network without other components. That is, the apparatus shown in FIG. 2 can handles ATM cells.

Now, detail explanation of embodiments of this invention will be made with reference to drawings, applying an concept of this invention.

Figure 3:
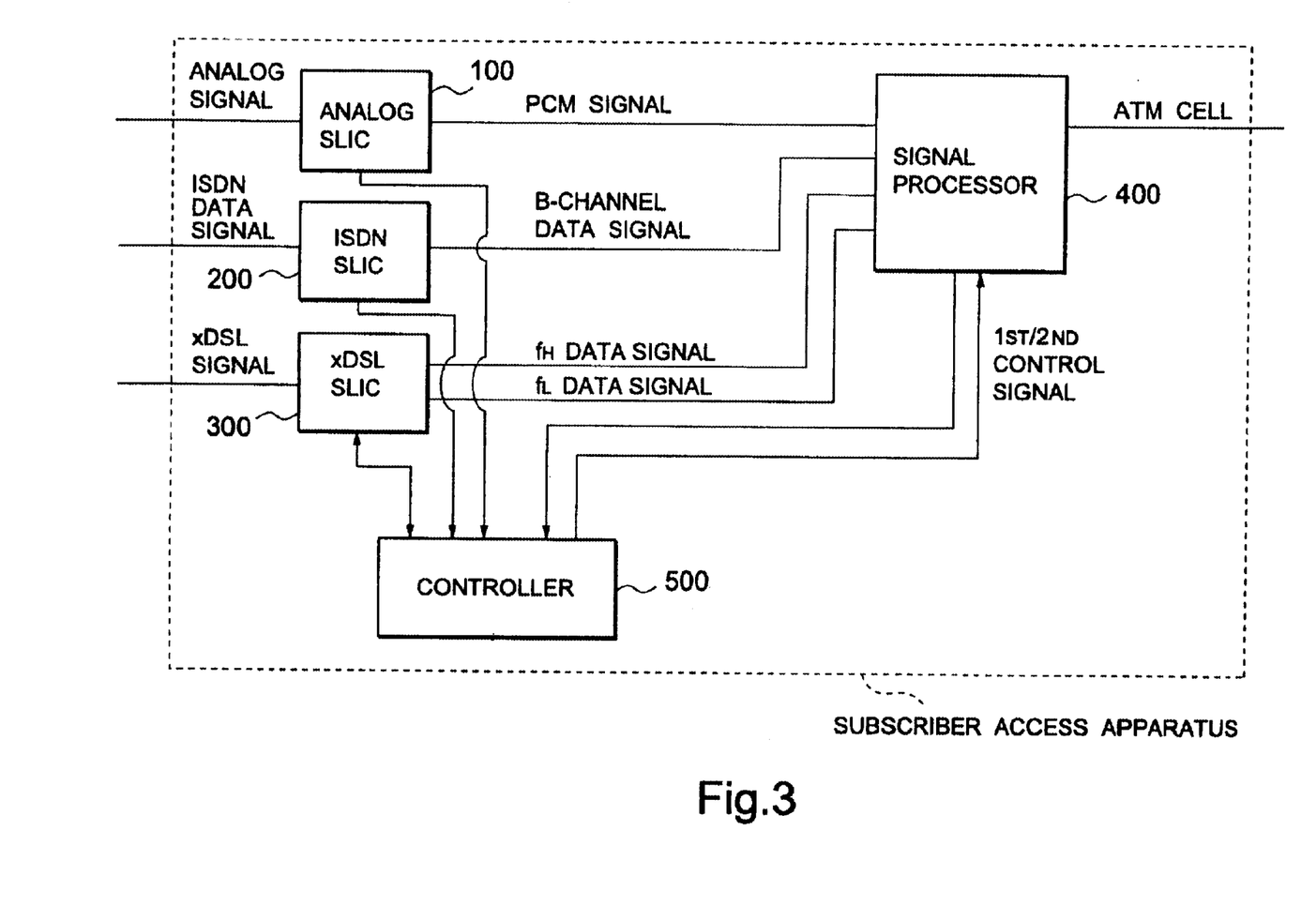
FIG. 3 is a block diagram of a subscriber access apparatus according to one aspect of this invention.

Referring to FIGS. 2 and 3, a subscriber access apparatus connects between the ATM Core Network on a upstream side and local access networks on a downstream side, of the analog communication access network, the ISDN access network, and the xDSL access network. That is, the illustrated apparatus can adapt all of the analog communication access network, the ISDN access network and the xDSL access network to the ATM Core Network. Herein, the analog communication access network has an analog communication line for analog signals, the ISDN access network has an ISDN line for ISDN data signals including B-channel data signals, and the xDSL access network has an xDSL line for xDSL signals. On the other hand, the ATM Core Network transfers ATM cells thereon. Herein, each ATM cell has a header and a payload.

The illustrated apparatus comprises an analog-SLIC 100, an ISDN-SLIC 200, an xDSL-SLIC 300, a signal processor 400 and a controller 500.

The analog-SLIC 100 is connected to the analog communication line and signal processor 400. Such analog-SLIC 100 upwardly converts the analog signals into pulse code modulation (PCM) signals to transmit the PCM signals into the signal processor 400. On the other hand, the analog-SLIC 100 downwardly converts the PCM signals transmitted from the signal processor 400 into the analog signals.

The ISDN-SLIC 200 connects between the ISDN line and the signal processor 400. When receiving, on the downstream side, the ISDN data signal from the ISDN line, the ISDN-SLIC 200 extracts the B-channel data signals from the ISDN data signals to produce the B-channel data signals as digital data signals. Such digital data signals of the B-channel data signals are input into the signal processor 400. On the other hand, the ISDN-SLIC 200 receives, on the upstream side, the B-channel data signals as the digital data signals from the signal processor 400 and then produces the ISDN data signals having the B-channel data signals.

The xDSL-SLIC 300 is connected to the xDSL line and can handle the xDSL signals, such as ADSL signals, VDSL signals, HDSL signals, and SDSL signals.

Such xDSL-SLIC 300 splits, on the downstream side, the xDSL signals into high and low frequency data signals referred to as $f_M$ and $f_L$ data signals in FIG. 3, respectively. The high frequency data signals contain the high-speed digital data, while the low frequency data signals contain the POTS (Plain Old Telephone Service) data or speech data. Herein, both of the high and low frequency data signals are digital signals.

On the other hand, the xDSL-SLIC 300 produces the xDSL signals corresponding to the high and low frequency data signals transmitted from the signal processor 400 on the upstream side.

The signal processor 400 is further connected to the ATM Core Network and carries out signal-processing in response to first and second control signals from the controller 500.

In detail, the signal processor 400 processes, on the downstream side, the PCM signals, the digital data signals and the high and low frequency data signals in response to the first control signal to output the ATM cells into the ATM Core Network. Herein, into payloads of the ATM cells, the PCM signals, the digital data signals and the high and low frequency data signals are mapped.

On the other hand, the signal processor 400 processes, on the upstream side, the ATM cells in response to the second control signal to divide the ATM cells into the PCM signals, the digital data signals, the high and low frequency data signals. As motioned above, the PCM signals, the digital data signals, high and the low frequency data signals are transmitted into the analog-SLIC 100, the ISDN-SLIC 200 and the xDSL-SLIC 300, respectively.

The controller 500 monitors the analog-SLIC 100, the ISDN-SLIC 200, the xDSL-SLIC 300 and the signal processor 400. Among them, if the signal processor 400 receives ATM cells from ATM Core Network, then the controller 500 produces the second control signal and outputs the signal into the signal processor 400. On the other hand, if at least one of the remaining components 100, 200 and 300 receives responding signals, then the controller 500 produces the first control signal and outputs the signal into the signal processor 400. That is, the controller 500 produces the first control signal in either case where the analog-SLIC 100 receives the analog signals, case where the ISDN-SLIC 200 receives the ISDN data signals, or case where the xDSL-SLIC 300 receives the xDSL signals.

With this structure, the subscriber access shown in FIG. 3 can adapt all of the analog communication access network, the ISDN access network and the xDSL access network to the ATM Core Network.

Figure 4:
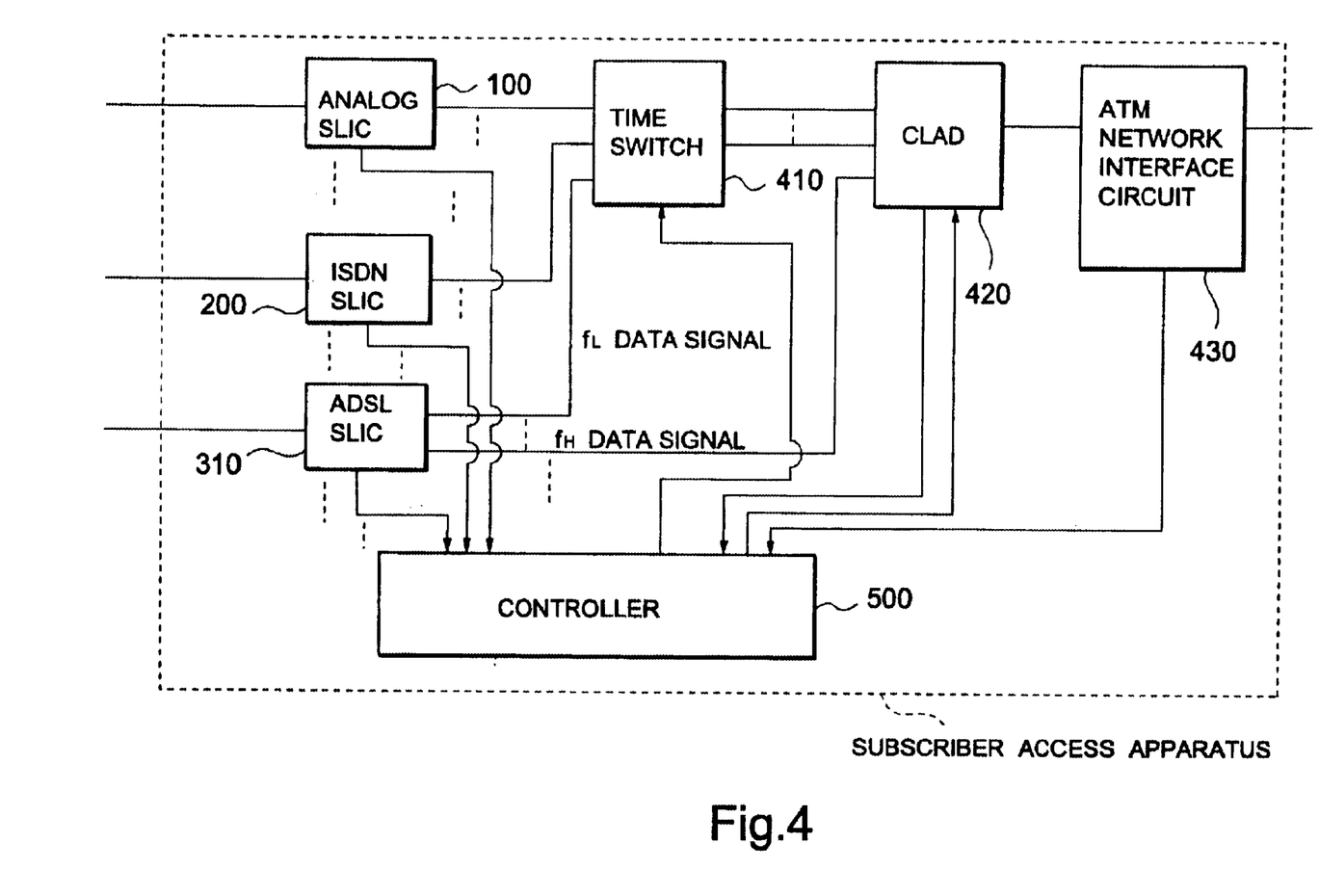
FIG. 4 is a block diagram of a subscriber access apparatus according to an embodiment of the present invention.

Referring to FIG. 4, the above apparatus is applied to the ADSL access network as the xDSL access network and comprises, as the above signal processor 400, a time switch 410, a CLAD device 420 and an ATM network interface circuit 430. Herein, CLAD stands for cell assembly and disassembly.

With the direction to the ADSL access network as the xDSL access network, the xDSL-SLIC is an ADSL-SLIC 310, the xDSL line is an ADSL line to be also connected, on a customer site, to an ADSL modem in compliance with ANSI T1.413 standard, and the xDSL signals is an ADSL signals. That is, the ADSL-SLIC 310 receives, on the downstream side, the ADSL signals to produce the high and low frequency data signals and receives, on the upstream side, the high and low frequency data signals to produce the ADSL signals. Additionally, the high frequency data signals is produced as provisional ATM cells by the ADSL-SLIC 310 in this embodiment.

In addition, in this embodiment, the analog-SLIC 100 introduces, into the time switch 410, the PCM signals which have 64 Kbps of data rate. The B-channel data signals, namely the digital data signals, and the low frequency data signals have 64 Kbps, respectively. The high frequency data signals bypass the time switch 410 and directly input into the CLAD device 420.

The illustrated time switch 410 receives, on the downstream side, the PCM signals, the digital data signals and the low frequency data signals all based 64 Kbpa of data rates and makes upward switch-paths to produce intermediate data signals in response to the first control signal. Herein, the intermediate data signals contain the PCM signals, the digital data signals and the low frequency data signals with their order in time guaranteed, Furthermore, the intermediate data signals are also 64 Kbps-signals.

On the other hand, the time switch 410 receives, on the upstream side, the intermediate data signals and makes downward switch-paths to produce the PCM signals, the digital data signals and the low frequency data signals in response to the second control signal.

The CLAD device 420 receives, on the downstream side, the intermediate data signals based 64 Kbps of data rate and the high frequency data signals and then assembles the ATM cells in response to the first control signal. On the other hand, the CLAD device 420 receives, on the upstream side, the ATM cells and then disassembles the ATM cells to produce the high frequency data signals and the intermediate data signals in response to the second control signal. Herein, when the CLAD device 420 receives the ATM cells transferred over specific connection of VPI or VCI, the CLAD device 420 transmits their data into the controller 500, too. With this function of the CLAD device 420, the controller 500 receives control data from an upstream exchange (not shown), and thereby, controls the time switch 410 and the CLAD device 420 in obedience to requests of the upstream exchange.

The ATM network interface circuit 430 is used in case where, the ATM Core Network has an interface to be connected to a synchronous optical network (SONET). Such ATM network interface circuit 430 receives the ATM cells and maps the ATM cells to the interface of the SONET. And thereby, the ATM cells are transmitted into an upstream exchange not shown in figure.

Figure 5:
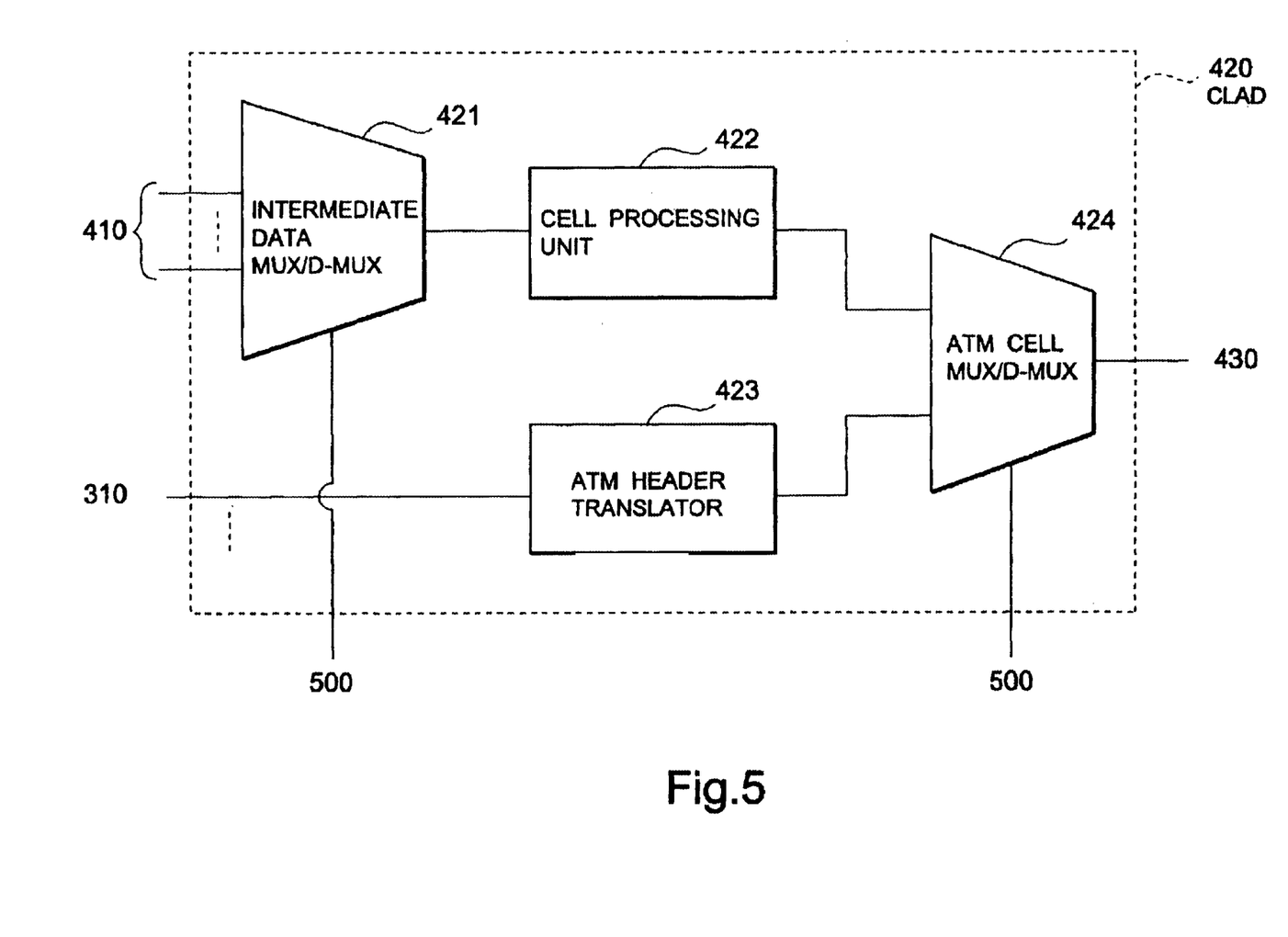
FIG. 5 shows a concrete example of the CLAD device illustrated in FIG. 4.

In detail, the CLAD device 420 may comprise an intermediate data multiplexer/demulplexer 421, a cell processing unit 422, an ATM header transfer 423 and an ATM cell multiplexer/demultiplexer 424, as shown in FIG. 5.

The illustrated intermediate data multiplexer/demulplexer 421 multiplexes, on the downstream side, the intermediate data signals to produce cell data signals in response to the first control signal. On the other hand, the intermediate data multiplexer/demultiplexer 421, demultiplexes, on the upstream side, the cell data signals to produce the intermediate data signals in response to the second control signal.

The cell processing unit 422 shown in FIG. 5 upwardly processes the cell data signals to produce first ATM cells and, on the other hand, downwardly processes the first ATM cells to produce the cell data signals.

The ATM header translator 423 receives the provisional ATM cells from the ADSL-SLIC 310 and upwardly translates headers of the provisional ATM cells to produce second ATM cells. On the other hand, the ATM header translator 423 receives, on the upstream side, the second ATM cells and downwardly translates headers of the second ATM cells to produce the provisional ATM cells.

The illustrated ATM cell multiplexer/demultiplexer 424 multiplexes, on the downstream side, the first and second ATM cells to produce the ATM cells in response to the first control signal. On the other hand, the ATM cell multiplexer/ demultiplexer 424 demultiplexes, on the upstream side, the ATM cells into the first and second ATM cells in response to the second control signal.

Figure 6:
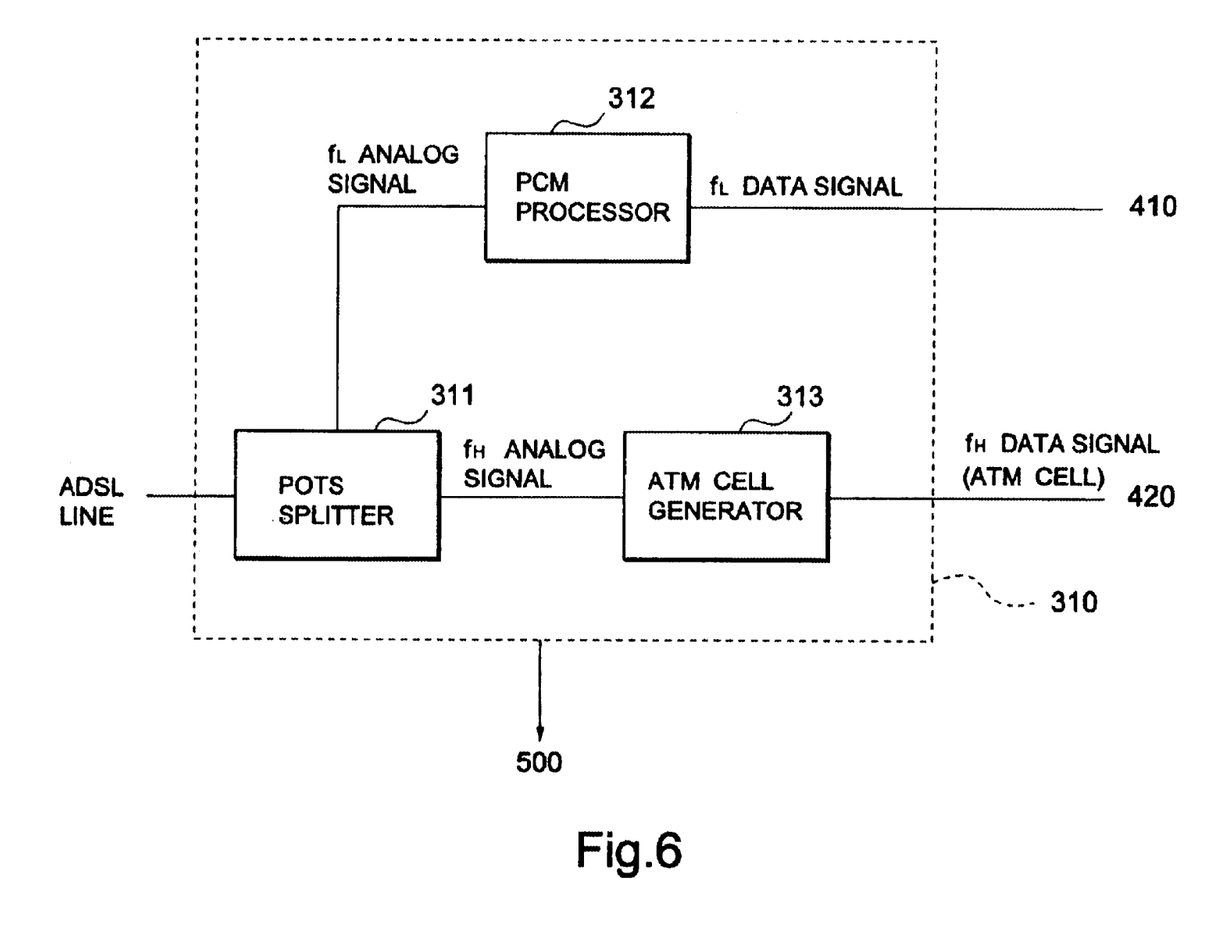
FIG. 6 shows a concrete example of the ADSL-SLIC illustrated in FIG. 4.

Referring to FIG. 6, the ADSL-SLIC 310 may comprise a POTS splitter 311, a PCM processor 312 and an ATM cell generator 313.

The illustrated POTS splitter 311 splits, on the downstream side, the ADSL signals into high and low frequency analog signals and combines, on the upstream side, the high and low frequency analog signals to produce the ADSL signals. In detail, the POTS splitter 311 executes filtering process to extract, as voice-data signals, only voice-band components from the ADSL signals. The extracted voice-data signals input into the PCM processor 312 as the low frequency analog signals. Owing to this function, the PCST splitter 311 is also called a voice filter. On the other hand, the remaining-band components of the ADSL signals pass through the POTS splitter 311 into the ATM cell generator 313. For example, such POTS splitter 311 comprises an analog filter, such as a low-pass filter and a high-pass filter.

The PCM processor 312 shown in FIG. 6, upwardly processes the low frequency analog signals to produce the low frequency data signals. On the other hand, the illustrated PCM processor 312 downwardly pocesses the low frequency data signals to produce the low frequency analog signals. In this embodiment, although the POTS splitter 311 and the PCM processor 312 are discrete from each other, these components may be integrated into one component.

The illustrated ATM cell generator 313 receives, on the downstream side, the high frequency analog signals and generates the provisional ATM cells as the high frequency data signals corresponding to the high frequency analog signals.

Figure 7:
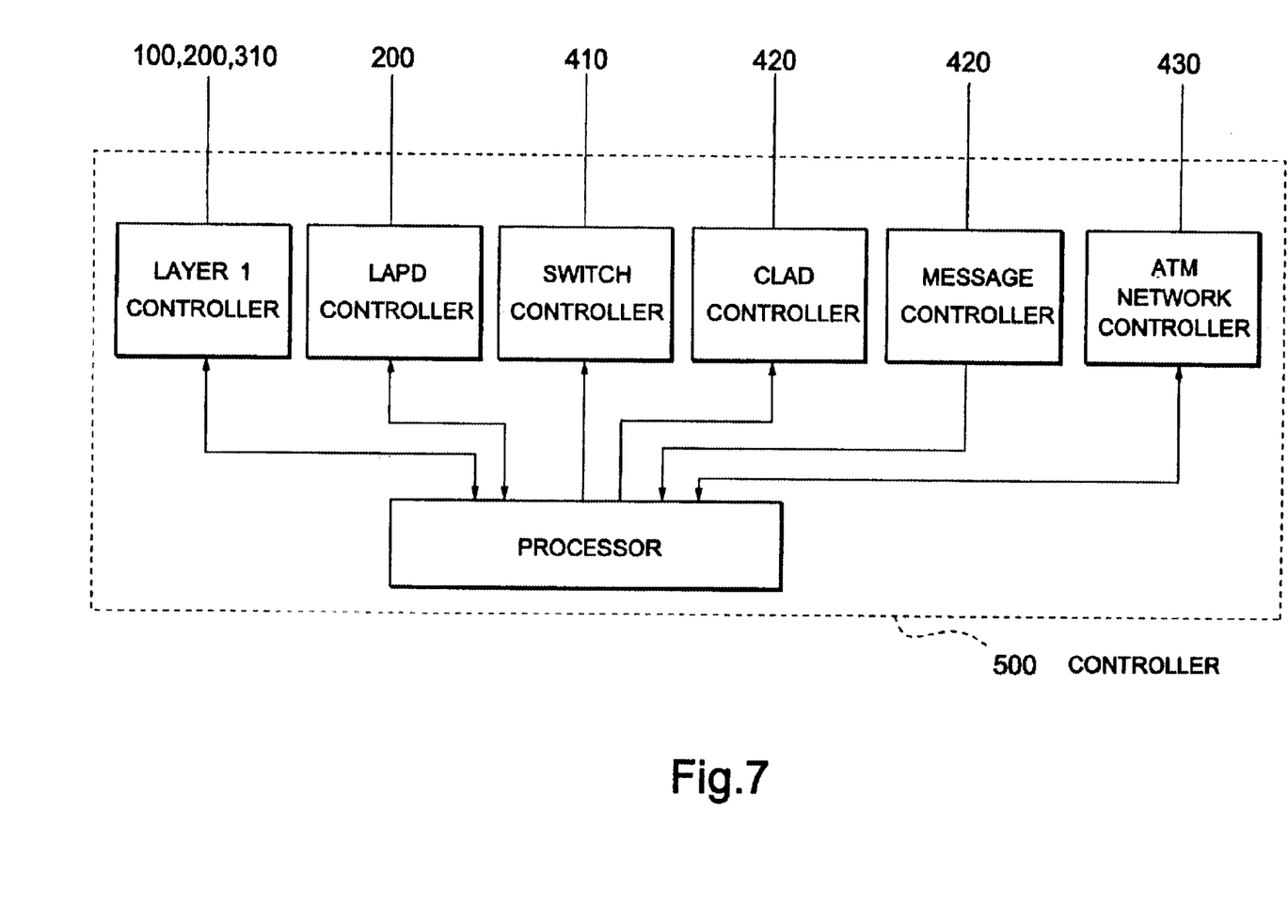
FIG. 7 shows a concrete example of the controller illustrated in FIG. 4.

Referring to FIG. 7, the controller 500 may comprise a layer 1 controller, a LAPD controller, a switch controller, a CLAD controller, a message controller and an ATM network controller. Herein, LAPD stands for link access procedure.

The layer 1 controller controls the analog-SLIC 100, the ISDN-SLIC 200 and the ADSL-SLIC 310 to allow access in the Layer 1, namely to establish the connection in the Layer 1. The LAPD controller controls the ISDN-SLIC 200 to terminate D-channel of channels formed over the ISDN access line.

In addition, the switch controller controls the time switch 410 by producing the first and second control signals indicative of making the upward and downward switch-paths, respectively. The CLAD controller controls the CLAD device 420 by producing the first and second control signals indicative of assembling the ATM cells and disassembling the ATM cells, respectively.

Furthermore, the message controller controls the CLAD device 420 to handle messages included in the ATM cells and the ATM network controller controls the ATM network interface circuit 430. In detail, the message controller carries out message-conversion for the messages of the ATM cells, in compliance with AAL protocol. Herein, AAL stands for ATM adaptation layer and is recommended by ITU-T. In addition, JP-A 6-276219 mentions about processing of AAL protocol and is incorporated herein by reference.

The processor monitors the layer 1 controller, the LAPD controller, the message controller and the ATM network controller to request that the switch controller and the CLAD controller produce the first and second control signals in correspondence with condition of the analog-SLIC 100, the ISDN-SLIC 200, the ADSL-SLIC 310 and the ATM network interface circuit 430.

In the above description, each SLIC accommodates only one subscriber, since the switchover from one type SLIC to another type SLIC can be carried out smoothly and unit of maintenance can be decreased in size. However, this does not restrict the scope of the present invention. That is, each SLIC may accommodate a plurality of subscribers. Moreover, though the above apparatus comprises only one ADSL-SLIC 310, the apparatus may comprise a plurality of ADSL-SLICs 310. The analog-SLICs 100 and the ISDN-SLICs 200 also.

Now, descriptions will made about operation of the subscriber access apparatus more concrete than the above description.

In this embodiment, since almost of the initialization and the call/connection control for the apparatus all are carried out by the upstream exchange of the ATM Core Network, other initialization carried by the apparatus itself is only to make condition that the apparatus, in question, can receive requests from the upstream exchange.

Concretely, the apparatus executes the initialization of itself as the followings: 1) Initial setting for the ATM network interface circuit 430, 2) Setting the ATM cell multiplexer/demultiplexer 424 to extract ATM headers transmitted into the controller 500, and 3) Initialization about the message controller included in the controller.

In this circumstance, further settings about every components in the apparatus are carried out, when the apparatus receives control message indicative of call/connection setting from the upstream exchange. Concretely, the following setting are executed in response to the control message:

1) Initializations of each SLICs.

These initializations may include establishments of connection in the Layer 1. With these initializations, the controller starts loop detection or the analog-SLIC 100, termination of D-channel included in the ISDN data signals, monitoring call requests for the ADSL-SLIC 310. If the controller 500 detects the variations of these SLICS, information signals are transmitted from the controller 500 to the upstream exchange through the CLAD device 420 and the ATM network interface circuit 430.

2) Path-setting in the time switch 410.

Detecting the call request or the call accepted from a subscriber, the upstream exchange requests to set the path in the time switch 410.

3) Setting to the CLAD device 420.

When the intermediate data signals input into the CLAD device 420, the relationship between timeslot No. on the time switch 410 and the headers of the ATM cells is established in the cell processing unit 422. In addition, a table which is for use in translating headers of the provisional ATM cells from ADSL-SLIC 310, is set up for the ATM header translator 423.

4) Additional setting to the CLAD device 420.

In case of necessity, priority is set up for the ATM cell multiplexer/demultiplexer 424 so that the ATM cells are multiplexed in compliance with the priority to be transmitted into the ATM network interface circuit 430.

After the above settings, the analog signals, the ISDN data signals and the ADSL signals are handled as described in below.

1) As mentioned above, the analog signals, the ISDN data signals and the ADSL signals are processed by the analog-SLIC 100, the ISDN-SLIC 200 and the ADSL-SLIC 310, and then, the PCM signals, the digital data signals and the low frequency data signals are transmitted into the time switch 410. The time switch 410 receives these signals, and then, transmits the intermediate data signals into the CLAD device 420. In the CLAD device 420, the intermediate data signals are multiplexed by the intermediate data multiplexer/demultiplexer 421, and then, their content data are mapped into payloads of the first ATM cells. Herein, the mapping is compliance with the above relationship set up by the controller 500. In addition, if voice data has 64 Kbps of data rate, 6 msec (=125 μsec×48) in time are required in order to map the voice data into payloads of the ATM cells, each of which has 48 Byte. The ATM cell multiplexer/demultiplexer 424 multiplexes the first and second ATM cells in compliance with priority controlled by the controller 500. Herein, other ATM cells from the controller 500 may be also multiplexed, if necessary. The ATM cells muiltiplexed by the multiplexer 424 are input into the ATM network interface circuit 430, and then, are introduced into the ATM Core Network.

2) On the other hand, when the ATM cells which have voice data and are output from the upstream exchange, are transmitted into the CLAD device 420 through the ATM network interface circuit 430, the ATM cell multiplexer/demultiplexer 424 identifies the ATM cells including voice data, according to the header thereof. The identified ATM cells are introduced into the cell processing unit 422. The cell processing unit 422 picks voice data up from the payloads of the ATM cells and transmits into the timeslots, based on the control of the controller 500.

3) In the CLAD device 420, when the high frequency data signals as the provisional ATM cells from the ADSL-SLIC 310 are input, and then the ATM header translator 423 translates the header of the provisional ATM cells and produces the second ATM cells to be transmitted into the ATM cell multiplexer/demultiplexer 424. Following operations are as the same operation of voice data.

Figure 8:
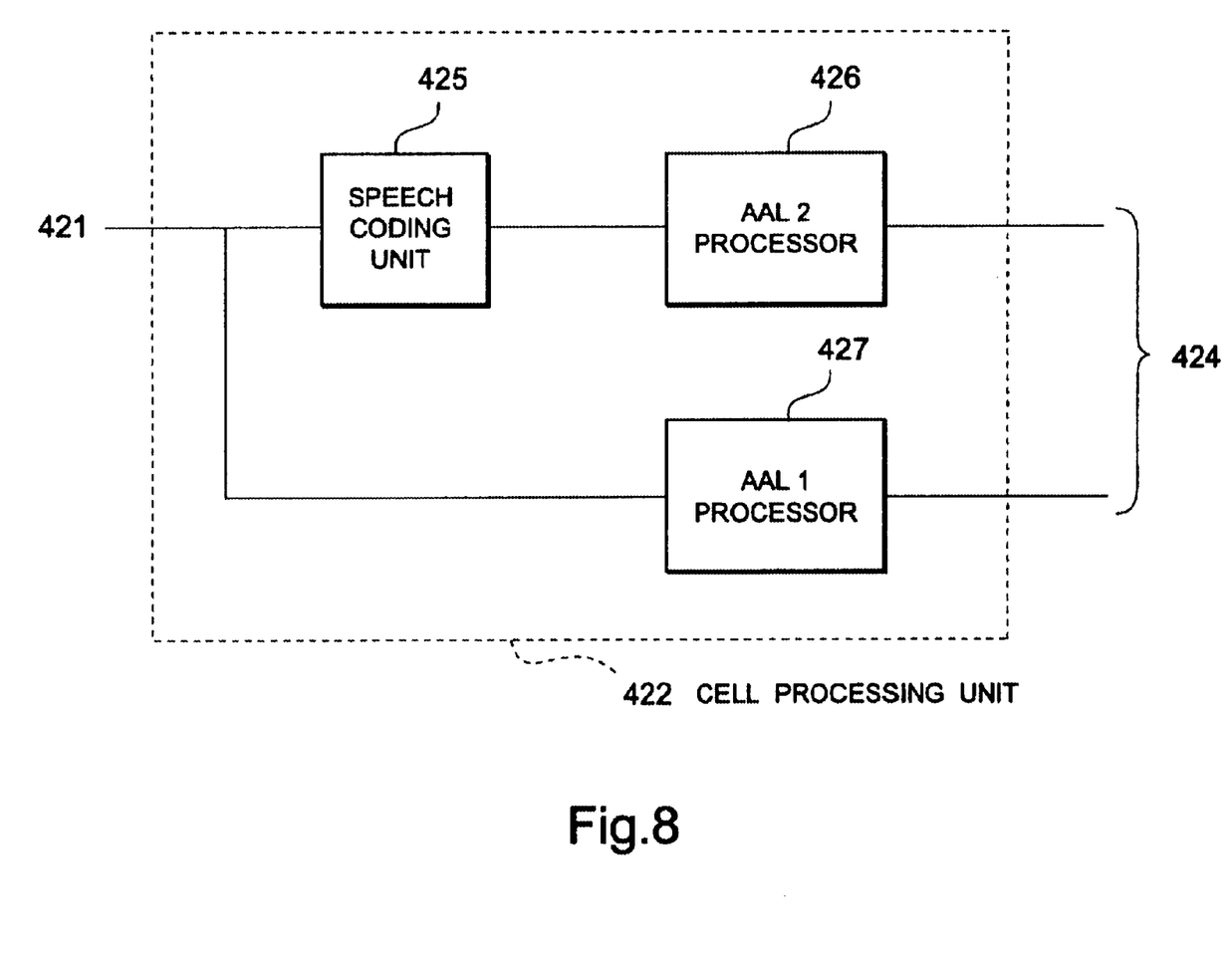
FIG. 8 shows the cell processing unit of the specific CLAD device in FIG. 5.

Referring to FIG. 8, the cell processing unit 422 may comprise a speech coding unit 425, an AAL 2 processor 426 and an AAL 1 processor 427. Herein, AAL 1 is used for connection-oriented, delay-sensitive services requiring constant bit rates, such as uncompressed video and other isochronous traffic, while AAL 2 is used for connection-oriented services that support a varable bit rate, such as some isochronous video and voice traffic. AAL 1 and AAL 2 are recommended as I.363.1 and I.363.2 by the ITU-T.

In detail, the speech coding unit 425 receives ones of the cell data signals from the intermediate data multiplexer/demultiplexer 421 and carries out high-efficiency speech coding to produce coded data signal. For example, the speech coding unit 425 may be complied with recommendation of ITU-T G series and may carry out coding of voice data or speech data. By such coding, the voice data are compressed so that the amount of data becomes 32 Kbps~8 Kbps and, as a result, high-efficiency data transmission is achieved.

The AAL 2 processor 426 is complied with ITU-T I.363.2 and processes the coded data signal to produce ones of the first ATM cells. Thus, AAL protocol is applied to the above processing so that a plurality of short cells can be inserted in the ATM cells which have common headers on the ATM Core Network, and thereby, lines can be effectually used.

The AAL 1 processor 427 is complied with ITU-T I.363.1 and processes others of the cell data signals to produce others of the first ATM cells.

Figure 9:
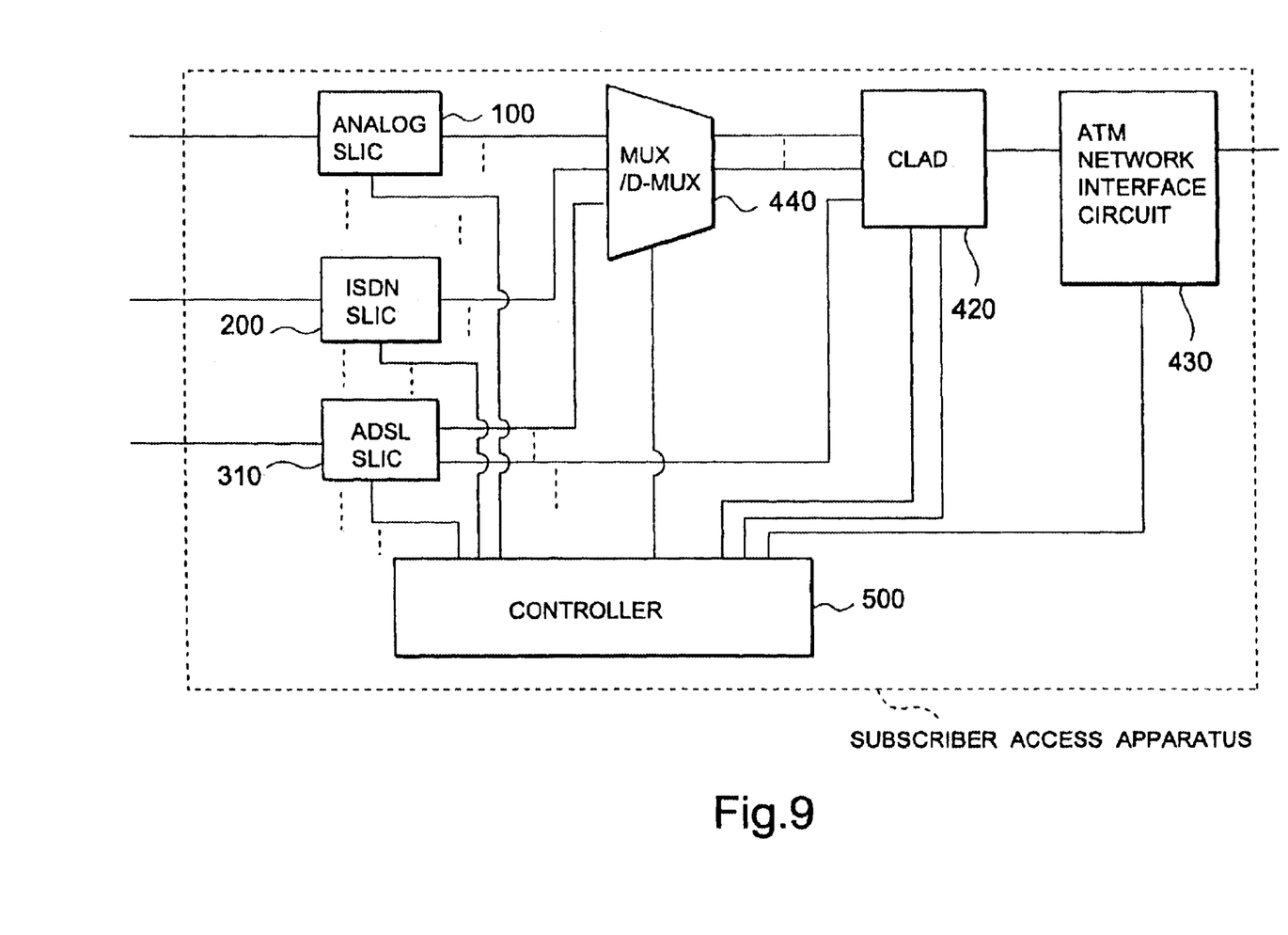
FIG. 9 shows a bloc diagram of a subscriber access apparatus according to another embodiment of the present invention.

Referring to FIG. 9, a subscriber access apparatus according to another embodiment of this invention is a modification of the above embodiment illustrated in FIG. 4. Thus, description of this embodiment will be directed only to a difference between the above embodiment and this one.

In such apparatus, the signal processor comprises a signal multiplexer/demultiplexer 440, the CLAD device 420 and the ATM network interface circuit 430. That is, in this embodiment, the time switch 410 in FIG. 4 is replaced by the signal multiplexer/demultiplexer 440.

The illustrated signal multiplexer/demultiplexer 440 receives, on the downstream side, the PCM signals, the digital data signals and the low frequency data signals to produce the intermediate data signals in response to the first control signal. On the other hand, the signal multiplexer/demultiplexer 440 receives, on the upstream side, the intermediate data signals to produce the PCM signals, the digital data signals and the low frequency data signals in response to the second control signal.

Such signal multiplexer/demultiplexer 440 can be obtained by fixing all paths in the time switch 410 illustrated in FIG. 4. In this event, switching function is achieved in the CLAD device. This application makes the structure of the apparatus simple.

Moreover, this invention also provides the method of use of the above apparatus as another aspect thereof.

The ATM network has a large amount of data transmission capacity. On the contrary, an amount of data transmission capacity of telephone subscriber lines and ISDN lines is much smaller than one of the ATM network, because capacity per one analog line is only 64 Kbps. For example, if the number of telephone subscriber lines is equal to 100, their transmission capacity becomes only 6 Mbps (=64 Kbps×100 lines). Besides, the number of lines is restricted to predetermined number, for example 200, and cannot be increased much, because of the role of the subscriber access apparatus in network architecture.

On the other hand, the high frequency data signals of the ADSL signals have about 40 Mbps at maximum. Therefore, an increase of such ADSL signals can contribute an efficiency use of the ATM network. For the purpose, it is proposed that the ATM cell multiplexer/demultiplexer 424 assign a suitable band to each SLIC of different types. The combination of the suitable bands causes an efficiency use of the ATM transmission capacity.

What is claimed is:

1. A subscriber access apparatus connected to an analog communication access network, an ISDN access network and an xDSL access network on a downstream side and connected to an ATM Core Network on an upstream side, wherein the analog communication access network has an analog communication line for analog signals, the ISDN access network has an ISDN line for ISDN data signals including B-channel data signals, the xDSL access network has an xDSL line for xDSL signals, and the ATM Core Network transfers ATM cells each having a header and a payload to the ATM Core Network, said apparatus comprising:

an analog subscriber line interface circuit (analog-SLIC) which is connected to the analog communication line and which carries out mutual conversion between the analog signals and pulse code modulation (PCM) signals;

an ISDN subscriber line interface circuit (ISDN-SLIC) which extracts the B-channel data signals from the ISDN data signals to produce, on the upstream side, the B-channel data signals as digital data signals and which produces, on the downstream side, the IDSN data signals having the B-channel data signals corresponding to the digital data signals;

an xDSL subscriber line interface circuit (xDSL-SLIC) which splits the xDSL signals to produce, on the upstream side, high and low frequency data signals and which produces, on the downstream side, the xDSL signals from the high and low frequency data signals;

a signal processor which:
  (a) processes the PCM signals, digital data signals and high and low frequency data signals, in response to a first control signal, to produce, on the upstream side, the ATM cells; and
  (b) processes the ATM cells in response to a second control signal to divide, on the downstream side, the ATM cells into the PCM signals, digital data signals, high and low frequency data signals; and a controller which:
  (a) produces the first control signal in response to at least one of the analog signals received by the analog-SLIC, the ISDN data signals received by the ISDN-SLIC and the xDSL signals received by the xDSL-SLIC; and
  (b) produces the second control signal in response to the ATM cells received by the signal processor from the ATM Core Network.

2. The subscriber access apparatus as claimed in claim 1, wherein the xDSL-SLIC is an ADSL-SLIC connectable, through an ADSL line as the xDSL line, to an ADSL modem, said ADSL line being given ADSL signals as the xDSL signals.

3. The subscriber access apparatus as claimed in claim 2, wherein the signal processor comprises:
  a time switch which receives, on a downstream side, the PCM signals, the digital data signals and the low frequency data signals and makes upward switch-paths to produce intermediate data signals in response to the first control signal and, which receives, on an upstream side, the intermediate data signals and makes downward switch-paths to produce the PCM signals, digital data signals and low frequency data signals in response to the second control signal; and
  a CLAD device which receives, on a downstream side, the intermediate data signals and the high frequency data signals and then assembles the ATM cells in response to the first control signal and, which receives, on an upstream side, the ATM cells and then disassembles the ATM cells to produce the high frequency data signals and the intermediate data signals in response to the second control signal.

4. A subscriber access apparatus as claimed in claim 3, the ATM Core Network having an interface connectable to a synchronous optical network (SONET), wherein the signal processor further comprises an ATM network interface circuit which receives the ATM cells and maps the ATM cells to the interface of the SONET.

5. A subscriber access apparatus as claimed in claim 3, wherein the ADSL-SLIC produces provisional ATM cells as the high frequency data signals.

6. A subscriber access apparatus as claimed in claim 5, wherein the CLAD device comprises:
  an intermediate data multiplexer/demulplexer which multiplexes, on the downstream side, the intermediate data signals to produce cell data signals in response to the first control signal and which demultiplexes, on the upstream side, the cell data signals to produce the intermediate data signals in response to the second control signal;
  a cell processing unit which processes, on the downstream side, the cell data signals to produce first ATM cells and which processes, on the upstream side, the first ATM cells to produce the cell data signals;
  an ATM header translator which translates, on the downstream side, headers of the provisional ATM cells to produce second ATM cells and which translates, on the upstream side, headers of the second ATM cells to produce the provisional ATM cells; and
  an ATM cell multiplexer/demultiplexer which multiplexes, on the downstream side, the first and second ATM cells to produce the ATM cells in response to the first control signal and which demultiplexes, on the upstream side, the ATM cells into the first and second ATM cells in response to the second control signal.

7. A subscriber access apparatus as claimed in claim 6, wherein the cell processing unit comprises:
  a speech coding unit which receives ones of the cell data signals and carries out high-efficiency speech coding to produce a coded data signal;
  a first processor that processes the coded data signal to produce ones of the first ATM cells; and
  a second processor that processes others of the cell data signals to produce others of the first ATM cells.

8. The subscriber access apparatus according to claim 7, wherein the first processor is an ATM Adaptation Layer (AAL) protocol 2 processor which complies with ITU-T I.363.2.

9. The subscriber access apparatus according to claim 7, wherein the second processor is an ATM Adaptation Layer (AAL) protocol 1 processor which complies with ITU-T I.363.1.

10. A subscriber access apparatus as claimed in claim 5, wherein the ADSL-SLIC comprises:
  a POTS (plain old telephone system) splitter which splits the ADSL signals into high and low frequency analog signals;
  a PCM processor which processes the low frequency analog signals to produce the low frequency data signals;
  an ATM cell generator which generates the provisional ATM cells as the high frequency data signals corresponding to the high frequency analog signals.

11. A subscriber access apparatus as claimed in claim 3, wherein the controller comprises:
  a Layer 1 controller which controls the analog-SLIC, the ISDN-SLIC and the ADSL-SLIC to allow access in the Layer 1;
  a LAPD controller which controls the ISDN-SLIC to terminate D-channel of channels formed over the ISDN access line;
  a switch controller which controls the time switch by producing the first and second control signals indicative of making the upward and downward switch-paths, respectively;
  a CLAD controller which controls the CLAD device by producing the first and second control signals indicative of assembling the ATM cells and disassembling the ATM cells, respectively;
  a message controller which controls the CLAD device to handle messages included in the ATM cells;
  an ATM network controller which controls the ATM network interface circuit;
  a processor which monitors the Layer 1 controller, the LAPD controller, the message controller and the ATM network controller to request that the switch controller and the CLAD controller produce the first and second control signals in correspondence with condition of the analog-SLIC, the ISDN-SLIC, the ADSL-SLIC and the ATM network interface circuit.

12. A subscriber access apparatus as claimed in claim 2, wherein the signal processor comprises:
   a signal multiplexer/demultiplexer which receives, on a downstream side, the PCM signals, digital data signals and low frequency data signals to produce intermediate data signals in response to the first control signal and which receives, on an upstream side, the intermediate data signals to produce the PCM signals, digital data signals and low frequency data signals in response to the second control signal; and
   a CLAD device which receives the intermediate data signals and the high frequency data signals and then assembles the ATM cells in response to the first control signal and, on the other hand, which receives the ATM cells and then disassembles the ATM cells to produce the high frequency data signals and the intermediate data signals in response to the second control signal.

13. The subscriber access apparatus according to claim 2, wherein the ADSL modem is formed in compliance with the ANSI T1.413 standard.

14. A method of upwardly adapting all of an analog communication access network, an ISDN access network and an xDSL access network to an ATM Core Network, wherein the analog communication access network has an analog communication line for analog signals, the ISDN access network has an ISDN line for ISDN data signals including B-channel data signals, and the xDSL access network has an xDSL line for xDSL signals, and the ATM Core Network transfers ATM cells each having a header and a payload to the ATM Core Network, said method comprising:
   detecting the analog signals, the ISDN data signals and the xDSL signals, to produce a control signal;
   converting the analog signals into pulse code modulation (PCM) signals;
   extracting the B-channel data signals from the ISDN data signals to produce the B-channel data signals as digital data signals;
   splitting the xDSL signals into high and low frequency data signals;
   converting, in response to the control signal, the PCM signals, the digital data signals and the low frequency data signals to produce intermediate data signals; and
   assembling ATM cells from the intermediate data signals and the high frequency data signals in response to the control signal.

15. A method of downwardly adapting an ATM Core Network to all of an analog communication access network, an ISDN access network and an xDSL access network, wherein the analog communication access network has an analog communication line for analog signals, the ISDN access network has an ISDN line for ISDN data signals including B-channel data signals, and the xDSL access network has an xDSL line for xDSL signals, and the ATM Core Network transfers ATM cells each having a header and a payload to the ATM Core Network, said method comprising:
   detecting inputs of the ATM cells to produce a control signal;
   disassembling the ATM cells to produce intermediate data signals and high frequency data signals in response to the control signal;
   dividing, in response to the control signal, the intermediate data signals into pulse code modulation (PCM) signals, digital data signals and low frequency data signals in correspondence with contents of the intermediate data signals;
   converting the PCM signals into the analog signals;
   producing the ISDN data signals, including the B-channel data signals, from the digital data signals; and
   combining the high and low frequency data signals to produce the xDSL signals.

16. A subscriber access apparatus comprising:
   an analog subscriber line interface circuit (SLIC) that carries out mutual conversion between analog signals and pulse code modulation signals;
   an ISDN SLIC that carries out mutual conversion between ISDN data signals and digital data signals;
   an xDSL SLIC which carries out mutual conversion between xDSL signals and high and low frequency data signals;
   a signal processor connected to the analog SLIC, the ISDN SLIC, and the xDSL SLIC, for carrying out mutual conversion between ATM cells and the pulse code modulation signals, the digital data signals, and the high and low frequency data signals; and
   a controller that is connected to the signal processor and to the analog SLIC, the ISDN SLIC, and the xDSL SLIC, wherein the controller controls the mutual conversion carried out by the signal processor.

17. The subscriber access apparatus according to claim 16, wherein the signal processor comprises an ATM network interface circuit which receives the ATM cells converted by the signal processor and maps the ATM cells to an interface of a synchronous optical network.

18. The subscriber access apparatus according to claim 16, wherein the xDSL SLIC produces provisional ATM cells as the high frequency data signals.

19. The subscriber access apparatus according to claim 16, wherein the signal processor comprises:
   a time switch that produces, on an upstream side, intermediate data signals from the pulse code modulation signals, the digital data signals, and the low frequency data signals and that produces, on a downstream side, pulse code modulation signals, digital data signals, and low frequency data signals from the intermediate data signals; and
   a cell assembly and disassembly (CLAD) device connected to the time switch, said CLAD assembling, on the upstream side, ATM cells from the intermediate data signals and disassembling ATM cells to produce high frequency data signals and intermediate data signals on a downstream side.

20. The subscriber access apparatus according to claim 19, wherein the CLAD device comprises:
   a data multiplexer/demultiplexer that multiplexes the intermediate data signals to produce cell data signals and which demultiplexes cell data signals to produce intermediate data signals;
   a cell processing unit that carries out mutual conversion between the cell data signals and first ATM cells;
   an ATM header translator that translates headers of the provisional ATM cells to produce second ATM cells and that translates said second ATM cells to produce provisional ATM cells; and
   an ATM cell multiplexer/demultplexer which multiplexes the first ATM cells and the second ATM cells and that demultiplexes the ATM cells into the first ATM cells and the second ATM cells.

21. The subscriber access apparatus according to claim 20, wherein the cell processing unit comprises:
- a speech coding unit which receives ones of the cell data signals and carries out high-efficiency speech coding to produce a coded data signal;
- a first processor that processes one of the coded data signals to produce ones of the first ATM cells; and
- a second processor that processes other of the cell data signals to produce others of the first ATM cells.

22. The subscriber access apparatus according to claim 16, wherein the ADSL SLIC comprises:
- a POTS (plaint old telephone system) splitter which splits the xDSL signals into high and low frequency analog signals;
- a PCM processor which processes the low frequency analog signals to produce the low frequency data signals; and
- an ATM cell generator which generates provisional ATM cells as the high frequency data signals corresponding to the high frequency analog signals.

23. The subscriber access apparatus according to claim 16, wherein the controller comprises a switch controller which controls a time switch by producing first and second control signals that are indicative of making upstream switch-paths and downstream switch-paths in the subscriber access apparatus.

24. The subscriber access apparatus according to claim 20, wherein the controller comprises a CLAD device controller that controls the CLAD device by producing first and second control signals indicative of assembling the ATM cells and disassembling the ATM cells.

25. The subscriber access apparatus according to claim 17, wherein the controller comprises an ATM network controller which controls the ATM network interface circuit.

26. The subscriber access apparatus according to claim 16, wherein the signal processor comprises:
- a signal multiplexer/demultiplexer which produces intermediate data signals from the PCM signals, the digital data signals, and the low frequency data signals, and produces the PCM signals, the digital data signals, and the low frequency data signals from intermediate data signals; and
- a cell assembly and disassembly (CLAD) device that assembles the ATM cells from the intermediate data signals and the high frequency data signals and which disassembles the ATM cells to produce the high frequency data signals and the intermediate data signals.

27. The subscriber access apparatus according to claim 21, wherein the first processor comprises an ATM Adaptation Layer (AAL) protocol 2 processor which complies with ITU-T I.363.2.

28. The subscriber access apparatus according to claim 21, wherein the second processor comprises an ATM Adaptation Layer (AAL) protocol 1 processor which complies with ITU-T I.363.1.

29. A subscriber access apparatus connected to an analog communication access network, an ISDN access network and an xDSL access network on a downstream side and connected to an ATM Core Network on an upstream side, wherein the analog communication access network has an analog communication line for analog signals, the ISDN access network has an ISDN line for ISDN data signals including B-channel data signals, the xDSL access network has an xDSL line for xDSL signals, and the ATM Core Network transfers ATM cells each having a header and a payload to the ATM Core Network, said apparatus comprising:
- an analog subscriber line interface circuit (analog-SLIC) which is connected to the analog communication line and which carries out mutual conversion between the analog signals and pulse code modulation (PCM) signals;
- an ISDN subscriber line interface circuit (ISDN-SLIC) which extracts the B-channel data signals from the ISDN data signals to produce, on the upstream side, the B-channel data signals as digital data signals and which produces, on the downstream side, the IDSN data signals having the B-channel data signals corresponding to the digital data signals;
- an xDSL subscriber line interface circuit (xDSL-SLIC) which splits the xDSL signals to produce, on the upstream side, high and low frequency data signals and which produces, on the downstream side, the xDSL signals from the high and low frequency data signals;
- a signal processor which:
  - (a) processes the PCM signals, digital data signals and high and low frequency data signals, in response to a first control signal, to produce, on the upstream side, the ATM cells; and
  - (b) processes the ATM cells in response to a second control signal to divide, on the downstream side, the ATM cells into the PCM signals, digital data signals, high and low frequency data signals; and
- a controller which:
  - (a) produces the first control signal in response to at least one of the analog signals received by the analog-SLIC, the ISDN data signals received by the ISDN-SLIC and the xDSL signals received by the xDSL-SLIC; and
  - (b) produces the second control signal in response to the ATM cells received by the signal processor from the ATM Core Network; and
- wherein the ATM Core Network having an interface connectable to a synchronous optical network (SONET), wherein the signal processor further comprises an ATM network interface circuit which receives the ATM cells and maps the ATM cells to the interface of the SONET.

* * * * *